United States Patent
Kido et al.

(10) Patent No.: US 9,836,247 B2
(45) Date of Patent: Dec. 5, 2017

(54) IMAGE PROCESSING SEMICONDUCTOR DEVICE AND IMAGE PROCESSING DEVICE

(71) Applicant: Renesas Electronics Corporation, Koutou-ku, Tokyo (JP)

(72) Inventors: Hideaki Kido, Hitachi (JP); Shoji Muramatsu, Hitachinaka (JP); Hiroyuki Hamasaki, Kanagawa (JP); Akihiro Yamamoto, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/157,310

(22) Filed: May 17, 2016

(65) Prior Publication Data
US 2016/0259596 A1 Sep. 8, 2016

Related U.S. Application Data

(63) Continuation of application No. 12/917,840, filed on Nov. 2, 2010, now Pat. No. 9,367,315.

(30) Foreign Application Priority Data

Nov. 4, 2009 (JP) .................. 2009-252856

(51) Int. Cl.
  *G06F 3/06* (2006.01)
  *G06K 9/00* (2006.01)
  *G06F 9/30* (2006.01)

(52) U.S. Cl.
  CPC .......... *G06F 3/0659* (2013.01); *G06F 3/0604* (2013.01); *G06F 3/0673* (2013.01); *G06F 9/30087* (2013.01); *G06K 9/00805* (2013.01)

(58) Field of Classification Search
  CPC ..... B60R 1/00; B60R 2300/105; B60R 11/04; H04N 7/181; G06F 9/30087; G06F 9/00805; G06F 3/0604; G06F 3/0673
  See application file for complete search history.

(56) References Cited

U.S. PATENT DOCUMENTS

2005/0099510 A1  5/2005  Nakazono et al.
2006/0142059 A1  6/2006  Ishiguro et al.
(Continued)

FOREIGN PATENT DOCUMENTS

JP   8-237519 A    9/1996
JP   2004-212658 A 7/2004
(Continued)

OTHER PUBLICATIONS

Office Action dated Jun. 10, 2013, in Japanese Patent Application No. 2009-252856.

*Primary Examiner* — Allen Parker
*Assistant Examiner* — Long H Le
(74) *Attorney, Agent, or Firm* — Shapiro, Gabor and Rosenberger, PLLC

(57) ABSTRACT

Provided is an image processing device capable of an image processing with using a general-purpose image processing hardware in accordance with video input without mediation of a CPU. The image processing device includes: a storage medium for storing an image data acquired by video inputting unit for acquiring video images; a CPU for a general processing; image processing unit for processing the image data stored in the storage medium; setting unit for determining a processing content of the image processing unit; a command list indicating an order of setting and activating the image processing unit; and command writing unit for setting and activating the image processing unit based on the command list in synchronization with input of the image data from the video inputting unit without mediation of the CPU.

4 Claims, 15 Drawing Sheets

(56) References Cited

U.S. PATENT DOCUMENTS

| | | | |
|---|---|---|---|
| 2006/0216053 A1* | 9/2006 | Shimazawa | G03G 15/5016 399/80 |
| 2008/0139072 A1* | 6/2008 | Kinoshita | B41J 2/04526 445/3 |
| 2008/0278577 A1 | 11/2008 | Otsuka et al. | |
| 2009/0207283 A1 | 8/2009 | Nakai et al. | |
| 2010/0110190 A1 | 5/2010 | Her | |

FOREIGN PATENT DOCUMENTS

| JP | 2005-078608 A | 3/2005 |
|---|---|---|
| JP | 2009-81496 A | 4/2009 |

\* cited by examiner

MOVE : VALUE : WRITING DESTINATION
LOAD : REGISTER : READING DESTINATION
SYNC : SYNCHRONIZATION TARGET
EXE
JUMP : READING DESTINATION
TRAP
END
SEND : SYNCHRONIZATION SIGNAL SENDING

FIG. 4
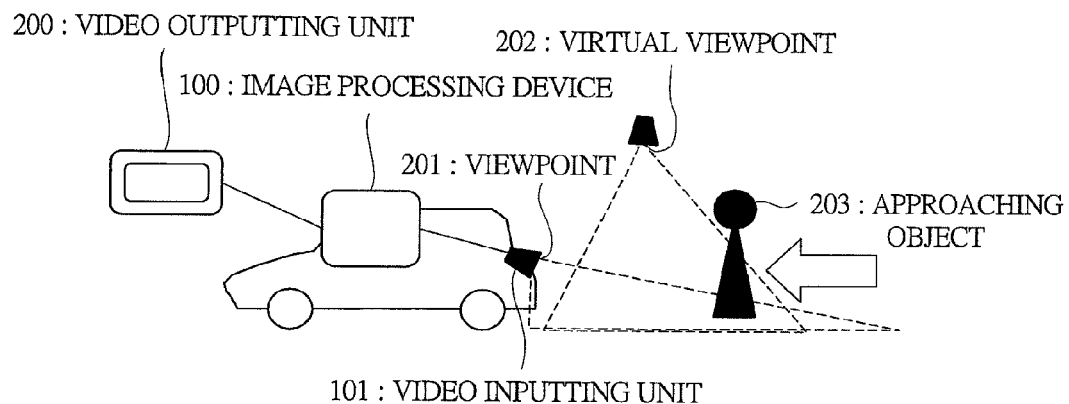
FIG. 5
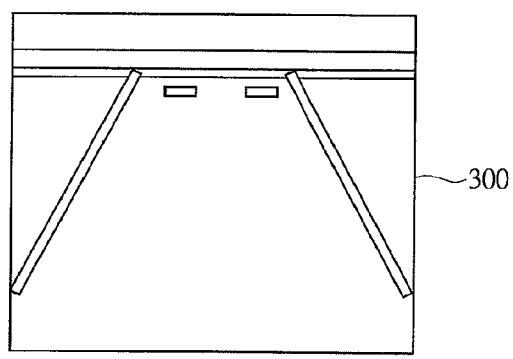
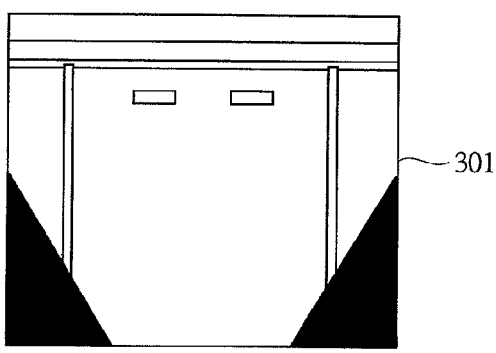

IMAGE PROCESSING SEMICONDUCTOR DEVICE AND IMAGE PROCESSING DEVICE

CROSS-REFERENCE TO RELATED APPLICATION

The present application claims priority from Japanese Patent Application No. 2009-252856 filed on Nov. 4, 2009, the content of which is hereby incorporated by reference into this application.

TECHNICAL FIELD OF THE INVENTION

The present invention relates to an image processing semiconductor device and an image processing device, which process images from an imaging device or others. More particularly, the present invention relates to an image processing semiconductor device and an image processing device, which activate and set an image processing hardware synchronized with input from an imaging device with using the image processing hardware for processing an image data and without using a general-purpose calculator.

BACKGROUND OF THE INVENTION

In recent years, an in-vehicle system on which a plurality of video inputting devices are installed has been expanded. For example, one camera is installed on each of front, back, right, and left sides of a motor vehicle to show entire peripheral environment to a user with using the video, so that safety is increased.

In such a system, an image (for example, a downward video image from above of the vehicle) viewed from a virtual viewpoint may be generated in order to display a better image to the user. At this time, each input image has to be converted into the image viewed from the virtual viewpoint. However, in order to make the system at low cost, a device for the processing may be one. The setting for the processing is different depending on the image input, and therefore, it is required to perform a plurality of the processing with using one conversion device.

For example, as seen in Japanese Patent Application Laid-Open Publication No. 2009-81496 (Patent Document 1), the plurality of conversion processing are achieved by storing a plurality of distortion-correcting parameters and rewriting the setting of a correcting device by a CPU depending on a status.

Also, in Japanese Patent Application Laid-Open Publication No. H08-237519 (Patent Document 2), the plurality of conversion processing are achieved by preparing a plurality of luminance-correcting tables and switching from one luminance-correcting table to the other in a hardware depending on a status.

SUMMARY OF THE INVENTION

For an image processing device as installed on a motor vehicle, as obstacle detection, real time performance may be required. This is because a risk resulting in a car accident arises due to the detection delay.

Also, in such an image processing device, operation of a plurality of applications is required. When the plurality of applications are operated, overhead in the processing time caused by communication and/or interruption among the applications is caused. However, the overhead badly affects the real time performance, and therefore, it is desirable to suppress the overhead as little as possible.

However, as seen in Patent Document 1, by switching the setting every time by the CPU, the CPU is interrupted in every image input, and therefore, the CPU saves the processing operated at the moment, and then, restarts the processing. The interrupted processing is delayed by the saving and restarting processes, and therefore, the delay badly affects the real time performance.

Also, in Patent Document 2, since the processing is switched in the hardware, such a problem as Patent Document 1 does not arise. However, hardwares for the video input processing and the correction processing have a structure that a storage medium such as a memory does not mediate the hardwares, and therefore, a problem that the hardware for the correction processing cannot be used for the other purpose arises.

Accordingly, a preferred aim of the present invention is, in an image processing hardware which can be used for general purpose, to provide an image processing device capable of performing an image processing in synchronization with a video input processing without mediation of a CPU.

The above and other preferred aims and novel characteristics of the present invention will be apparent from the description of the present specification and the accompanying drawings.

The typical ones of the inventions disclosed in the present application will be briefly described as follows.

That is, the typical one includes: a CPU for performing a general processing; an image processing unit for processing an image data acquired by a video inputting unit for acquiring the video; a setting unit for determining a processing content of the image processing unit; and a command writing unit for setting and activating the image processing unit without mediation of the CPU in synchronization with image-data input from the video inputting unit based on a command list indicating an order of the setting and activation of the image processing unit.

The effects obtained by typical aspects of the present invention will be briefly described below.

That is, the effect obtained by typical aspects is, in an image processing hardware which can be used for general purpose, to start the image processing in synchronization with the image-data input without the mediation of the CPU.

BRIEF DESCRIPTIONS OF THE DRAWINGS

FIG. 4 is an explanatory diagram explaining a specific usage example of the image processing device according to the embodiment of the present invention;

FIG. 5 is a diagram illustrating an image processing example in the specific usage example of the image processing device according to the embodiment of the present invention;

DESCRIPTIONS OF THE PREFERRED EMBODIMENTS

Hereinafter, the embodiment of the present invention will be described in detail with reference to the accompanying drawings. Note that components having the same function are denoted by the same reference symbols throughout the drawings for describing the embodiment, and the repetitive description thereof will be omitted.

Figure 1:
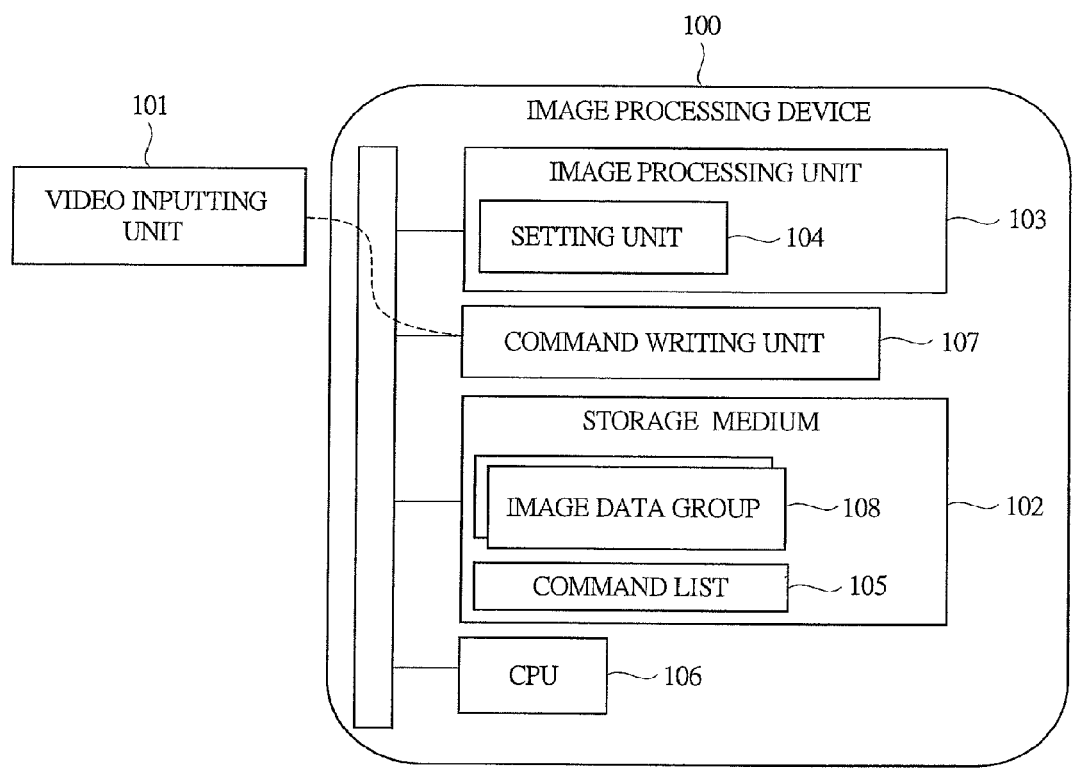
FIG. 1 is a structure diagram illustrating a basic structure of an image processing device according to an embodiment of the present invention.
Figures 2, 3:
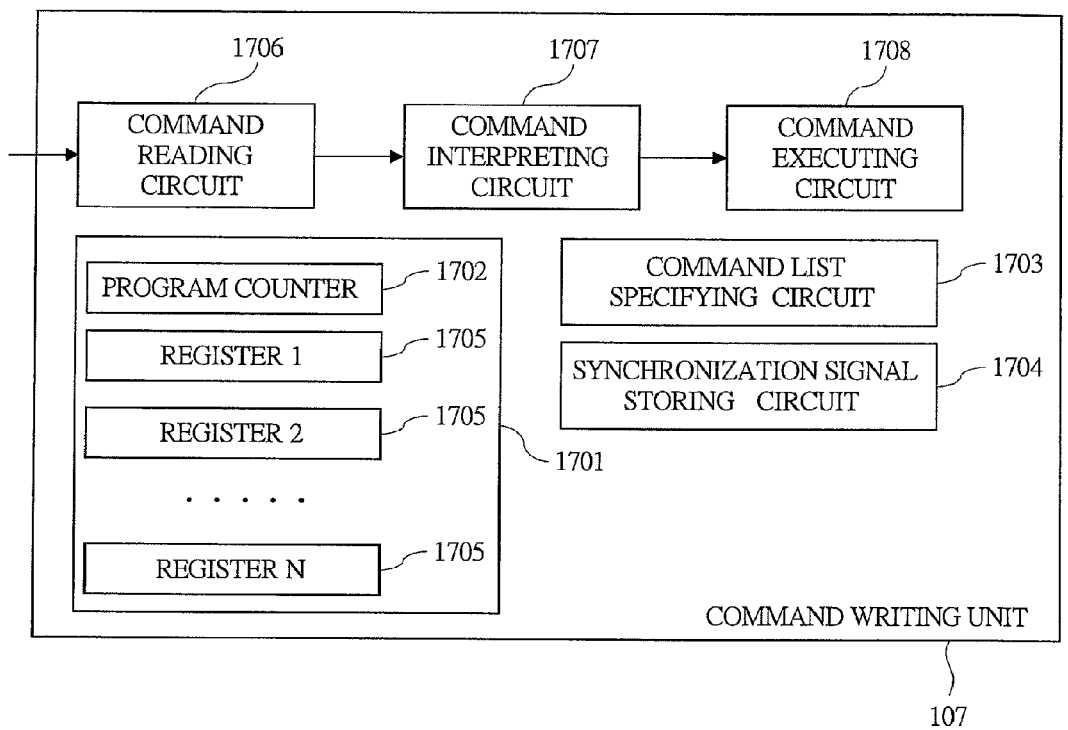
FIG. 2 is a diagram illustrating a structure of a command writing unit in the image processing device according to the embodiment of the present invention.
FIG. 3 is a diagram partially showing a command written in a command list used in the image processing device according to the embodiment of the present invention.

With reference to FIGS. 1 to 3, a basic structure of an image processing device according to the embodiment of the present invention is described. FIG. 1 is a structure diagram illustrating the basic structure of the image processing device according to the embodiment of the present invention, FIG. 2 is a diagram illustrating a structure of a command writing unit in the image processing device according to the embodiment of the present invention, and FIG. 3 is a diagram partially showing commands written in a command list used in the image processing device according to the embodiment of the present invention.

In FIG. 1, an image processing device 100 includes: a storage medium 102 which is storage unit; an image processing unit 103; a CPU (central processing unit) 106; and a command writing unit 107, and is connected with a video inputting unit 101 such as a video camera. The image processing unit 103 includes a setting unit 104 for specifying a type and/or activation of the image processing. In the storage medium 102, image data groups 108 and a command list 105 are stored.

The storage medium 102, the image processing unit 103, the CPU 106, and the command writing unit 107 in the image processing device 100 are formed on a semiconductor device to structure a semiconductor chip which is an image processing semiconductor device.

Note that, in the image processing device 100, all of the storage media 102, the image processing unit 103, the CPU 106, and the command writing unit 107 may be mounted as one chip, or may be structured as collection of a plurality of semiconductor chips.

The image processing device 100 stores a video data acquired from the video inputting unit 101 in the image data groups 108 inside the storage medium 102. The image processing unit 103 executes the image processing based on information set in the setting unit 104. The writing of the information to the setting unit 104 is performed so as to mediate the CPU 106 or the command writing unit 107.

The writing to the setting unit 104 by the command writing unit 107 is performed so as to autonomously interpret the command list 105 inside the storage medium 102 without mediation of the CPU 106, and the interpretation and execution for the command list 105 is started as triggered by an activation command from the CPU 106, a video-capturing end synchronization signal from the video inputting unit 101, or others.

Note that, in addition, structure in which the command writing unit 107 and/or the command list 105 are included inside the image processing unit 103 is also considered.

In FIG. 2, the command writing unit 107 includes: an internal register 1701; command list specifying circuit 1703; synchronization signal storing circuit 1704; a command reading circuit 1706; a command interpreting circuit 1707; and a command executing circuit 1708, and the internal register 1701 includes a program counter 1702 and a plurality of registers 1705.

The command writing unit 107 reads the command list 105 specified by a memory address or others on the storage medium 102 from the storage medium 102 with using the command list specifying circuit 1703, and sequentially interprets and executes a command written in the specified command list (with using the command reading circuit 1706, the command interpreting circuit 1707, and the command executing circuit 1708).

Also, the interpreted and executed command is specified with using the program counter 1702. Further, the synchronization signal storing circuit 1704 controls a synchronization signal from an external device.

In the command writing unit 107, its functions are limited to the register writing and reading, so that a simpler structure than that of a general-purpose calculator such as the CPU 106 is achieved.

FIG. 3 partially shows the plurality of commands written in the command list 105.

In the commands written in the command list 105 shown in FIG. 3, a "MOVE" command is a command for specifying addresses and/or writing contents of the setting unit 104 and the storage medium 102 which are writing destinations, and a "LOAD" command is a command for writing an arbitral value stored in the setting unit 104 and the storage medium 102 into the internal register 1701 inside the command writing unit 107.

A "SYNC" command is a command for making the processing wait until the video capturing end synchronization signal from the video inputting unit 101, the image processing end synchronization signal from the image processing unit 103, or others is inputted. The synchronization with plural unit can be specified.

An "EXE" command is a command for activating the image processing unit 103, and a "JUMP" command is a command for rewriting the specified value in the program counter 1702. A "TRAP" command is a command for interrupting the CPU 106.

An "END" command is a command for ending the command list. A "SEND" command is a command for sending a synchronization signal to another unit, and is used, for example, when a plurality of the image processing units 103 exist, as communication unit between the image processing units.

Next, with reference to FIGS. 4 and 5, a specific usage example of the image processing device according to the embodiment of the present invention is described. FIG. 4 is an explanatory diagram explaining a specific usage example of the image processing device according to the embodiment of the present invention, and FIG. 5 is a diagram illustrating an image processing example in the specific usage example of the image processing device according to the embodiment of the present invention.

In FIG. 4, the image processing device 100 is assumed, in which the video inputting unit 101 is installed on a motor vehicle, and a video obtained from the video inputting unit is processed and displayed on the video outputting unit 200.

When the video inputting unit 101 is installed at a position of a viewpoint 201 illustrated in FIG. 4, the obtained video image is the one from the viewpoint 201. For example, a video image illustrated as a numeral symbol 300 in FIG. 5 is the one. However, in order to show a video image intuitively understandable for a user, it is considered that a video image as viewed from a virtual viewpoint illustrated as a virtual viewpoint 202 in FIG. 4 is acquired by conversion of the image processing unit 103.

For example, a video image denoted by a numeral symbol 301 in FIG. 5 is the one. Hereinafter, it is considered that a processing of recognizing an approaching object 203 to a motor vehicle in an image is exemplified, and the recognition of the approaching object is performed by the image processing unit 103 for the processing for the viewpoint conversion and the CPU 106 for the processing for the converted image data.

Figure 6:
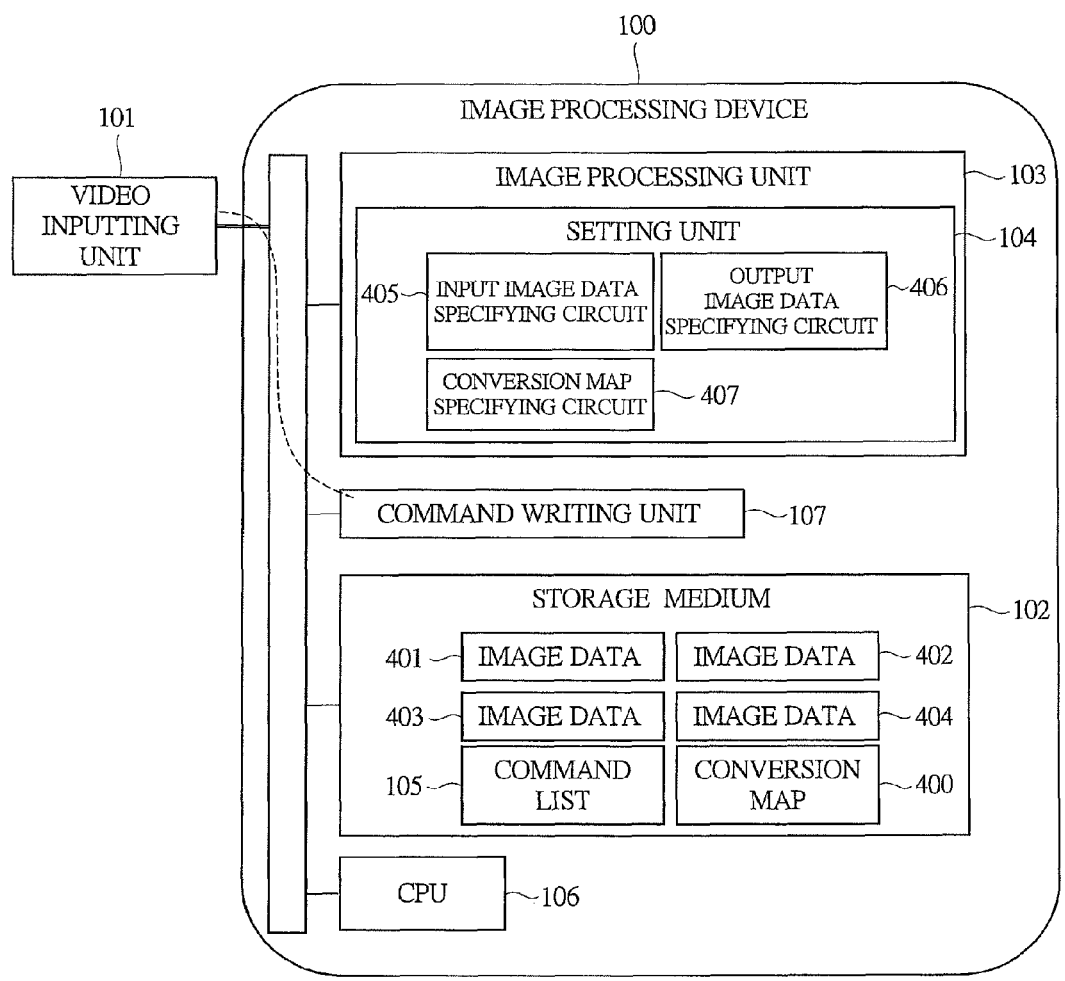
FIG. 6 is a structure diagram illustrating a detailed structure of an image processing device in the usage example illustrated in FIG. 4.

With reference to FIG. 6, a detailed structure of the image processing device in the usage example illustrated in FIG. 4 is described. FIG. 6 is a structure diagram illustrating the detailed structure of the image processing device in the usage example illustrated in FIG. 4.

In the image processing device 100 illustrated in FIG. 6, the setting unit 104 inside the image processing unit 103 and data stored in the storage medium 102 are subdivided as compared to the image processing device 100 illustrated in FIG. 1. The setting unit 104 includes: an input image data specifying circuit 405 for specifying an input-source image data; and an output image data specifying circuit 406 for specifying an output-destination image data; and a conversion map specifying circuit 407 for specifying a used conversion map with using a memory address on the storage medium 102 or others, and the storage medium 102 stores image data 401 to 404, the command list 105, and a conversion map 400.

In the structure illustrated in FIG. 6, the conversion map 400 storing a parameter for the viewpoint conversion is stored in the storage medium 102. The image processing unit 103 converts the image in accordance with the conversion map 400.

Also, it is assumed to switch an image data in a writing destination depending on either an odd frame or an even frame of a video input frame, and to write the converted data on the respective image data different from each other. More specifically, when the odd frame is inputted, the image data is written on the image data 401 first, and then, a result converted by the image processing unit 103 is written on the image data 402.

When the even frame is inputted, the image data is written on the image data 403 first, and then, a result converted by the image processing unit 103 is written on the image data 404.

Hereinafter, although the present embodiment describes that the conversion map 400 and the command list 105 are as different units from each other, a structure in which the conversion map 400 is embedded in the command list 105 is also considered. In this case, the conversion map specifying circuit 407 is unnecessary.

Also, hereinafter, the image processing unit 103 is used for the image conversion with using the conversion map 400 as one example. However, this is not limited to the image conversion, and may be used for a processing after another image input, such as contrast control or color correction. In addition, a plurality of processing can be collectively performed, so that more flexible processing becomes possible by forming the command list for the plurality of processing.

Figure 7:
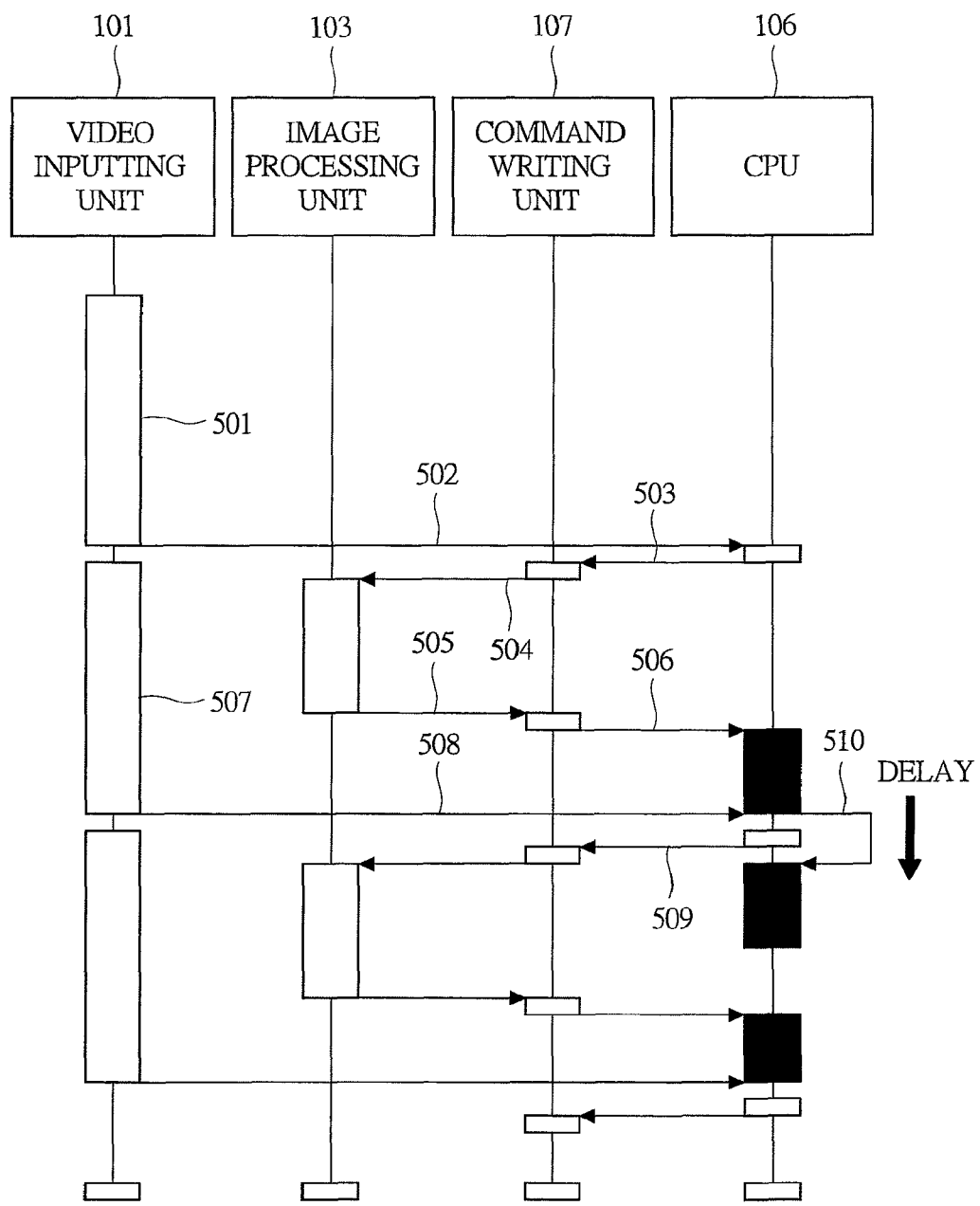
FIG. 7 is a diagram illustrating a processing flow as a comparison example of the image processing device according to the embodiment of the present invention.
Figure 8:
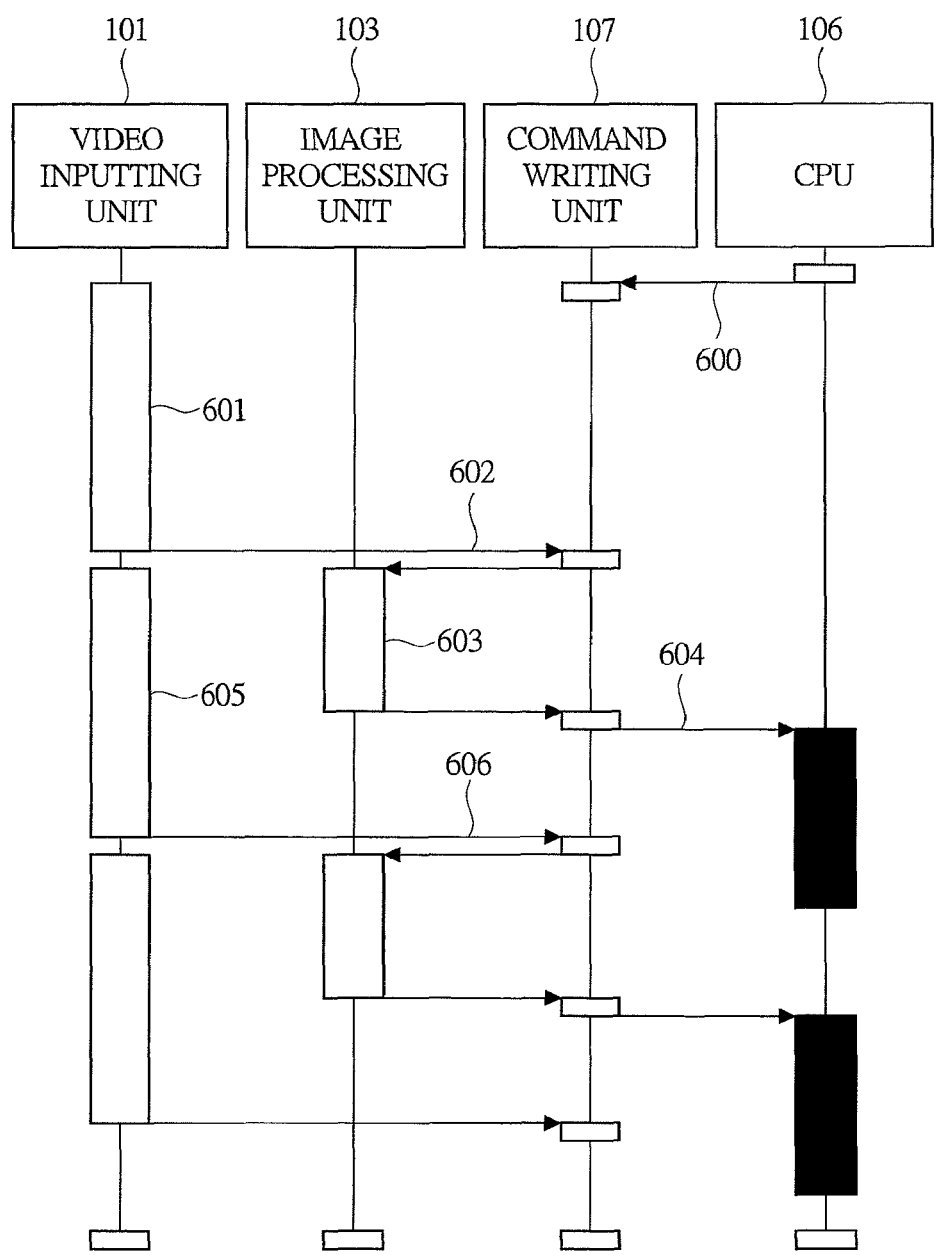
FIG. 8 is a diagram illustrating a processing flow of the image processing device according to the embodiment of the present invention.
Figure 9:
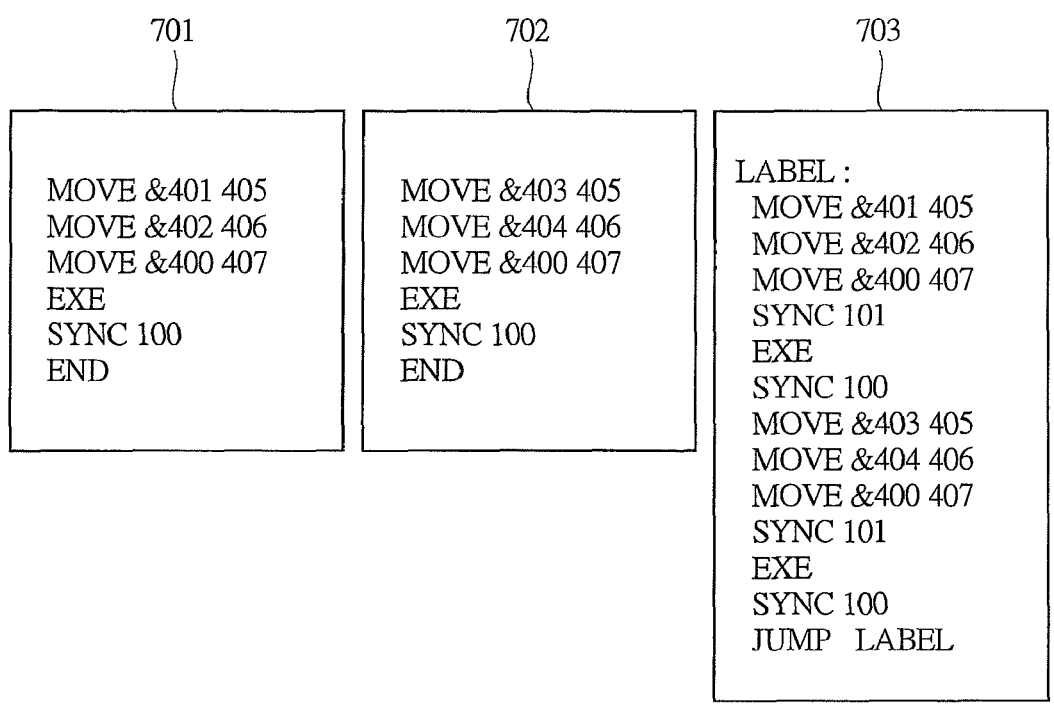
FIG. 9 is a diagram showing an example of a command list used in the image processing device according to the embodiment of the present invention and its comparison example.

Next, with reference to FIGS. 7 to 9, a processing flow in generating the viewpoint conversion image as changing the setting for the image processing unit in the image processing device according to the embodiment of the present invention is described. FIG. 7 is a diagram illustrating a processing flow as a comparison example of the image processing device according to the embodiment of the present invention, and shows, in a conventional technique, a processing that the CPU 106 receives a video end synchronization signal from the video inputting unit 101 as an interruption signal, and further, the CPU 106 activates the command writing unit 107. FIG. 8 is a diagram illustrating a processing flow of the image processing device according to the embodiment of the present invention, and shows a processing that the command writing unit 107 receives the video end synchronization signal from the video inputting unit 101, and autonomously processes the signal. FIG. 9 is a diagram illustrating an example of a command list used in the image processing device according to the embodiment of the present invention and its comparison example.

By the command list shown as 701 and 702 in FIG. 9, the processing illustrated in FIG. 7 is executed. First, the video capture by the video inputting unit 101 is completed (step 501), and then, the CPU 106 is interrupted by a signal from the video inputting unit 101 (step 502).

The CPU 106 specifies the command list 701 to the command list specifying circuit 1703 in the command writing unit 107, and activates the command writing unit 107 (step 503). The command writing unit 107 reads the command list 701, and executes as interpreting the command list.

More specifically, as shown by the "MOVE" commands in the command list 701 first, the input image data 401, the output image data 402, and the conversion map 400 are specified by the input image data specifying circuit 405, the output image data specifying circuit 406, and the conversion map specifying circuit 407, respectively.

Next, the image processing unit 103 is activated by the "EXE" command (step 504), the processing is waited by the "SYNC" command (SYNC 100) until the end signal from the image processing unit 103 is inputted (step 505), the CPU 106 is interrupted (step 506), and a series operation is ended by the "END" command.

After the CPU 106 is interrupted by the end interruption signal in the step 506, the CPU 106 starts, for example, the recognition processing based on the image data processed by the image processing unit 103 or others.

Here, a status that the next video capture is ended during the recognition processing (step 507) and the CPU 106 is interrupted again (step 508) is considered.

Since the CPU 106 is in a status of the recognition processing at this time, the processing is stopped once, and information required for restarting the processing is waited, and then, the CPU 106 specifies the command list 702 to the command list specifying circuit 1703 in the command writing unit 107 (step 509), and restarts the stopped processing (step 510).

By repeating the above-described processing, the image processing for the image data from the video inputting unit 101 is performed.

As described above, as a conventional technique, when the CPU 106 receives the interruption signal of the end of the video inputting unit 101, if the CPU 106 is in a status of execution at the moment when the interruption signal is received, the CPU 106 has to stop the processing, and therefore, the stopped processing is delayed.

Compared to this, in the present embodiment, a processing illustrated in FIG. 8 is executed by the command list shown as 703 in FIG. 9.

In the processing illustrated in FIG. 8, before the first video capture is ended, the CPU 106 specifies the command list 703 to the command list specifying circuit 1703 in the command writing unit 107, and activates the command writing unit (step 600).

First, the processing proceeds to writing commands (MOVE) for the setting unit 104 in the image processing unit 103. Each of the input image data, the output image data, the conversion map, and others is set in the setting unit 104, and then, the processing is waited by a next "SYNC" command (SYNC 101) until a synchronization signal indicating the end of the video input is inputted.

And, after the video capture by the video inputting unit 101 is completed (step 601), the command writing unit 107 receives a video capture end synchronization signal (step 602), and the image processing unit 103 is activated by the next "EXE" command of the "SYNC" command (Step 603).

The processing is waited by the next "SYNC" command (SYNC 100) until the end signal from the image processing unit 103 is inputted, and the CPU 106 is interrupted by the "TRAP" command (step 604). After the end interruption in the step 604 is inputted to the CPU 106, the CPU 106 starts, for example, the recognition processing based on the image data processed by the image processing unit 103 or others.

Here, when a status that the next video capture is ended during the recognition processing by the CPU 106 is considered (step 605), the end synchronization signal is inputted to the synchronization signal storing circuit 1704 in the command writing unit 107 (step 606), the waiting status by the "SYNC" command is awoken, a next command is interpreted, the image processing unit 103 is activated again, and the same processing is repeated.

At this time, the CPU 106 is not interrupted by the video capture end signal. That is, a function capable of handling the synchronization signal with the video input is added to the command writing unit 107, so that it is not required to stop the recognition processing in the CPU 106, and therefore, the recognition processing is not delayed.

Figure 10:
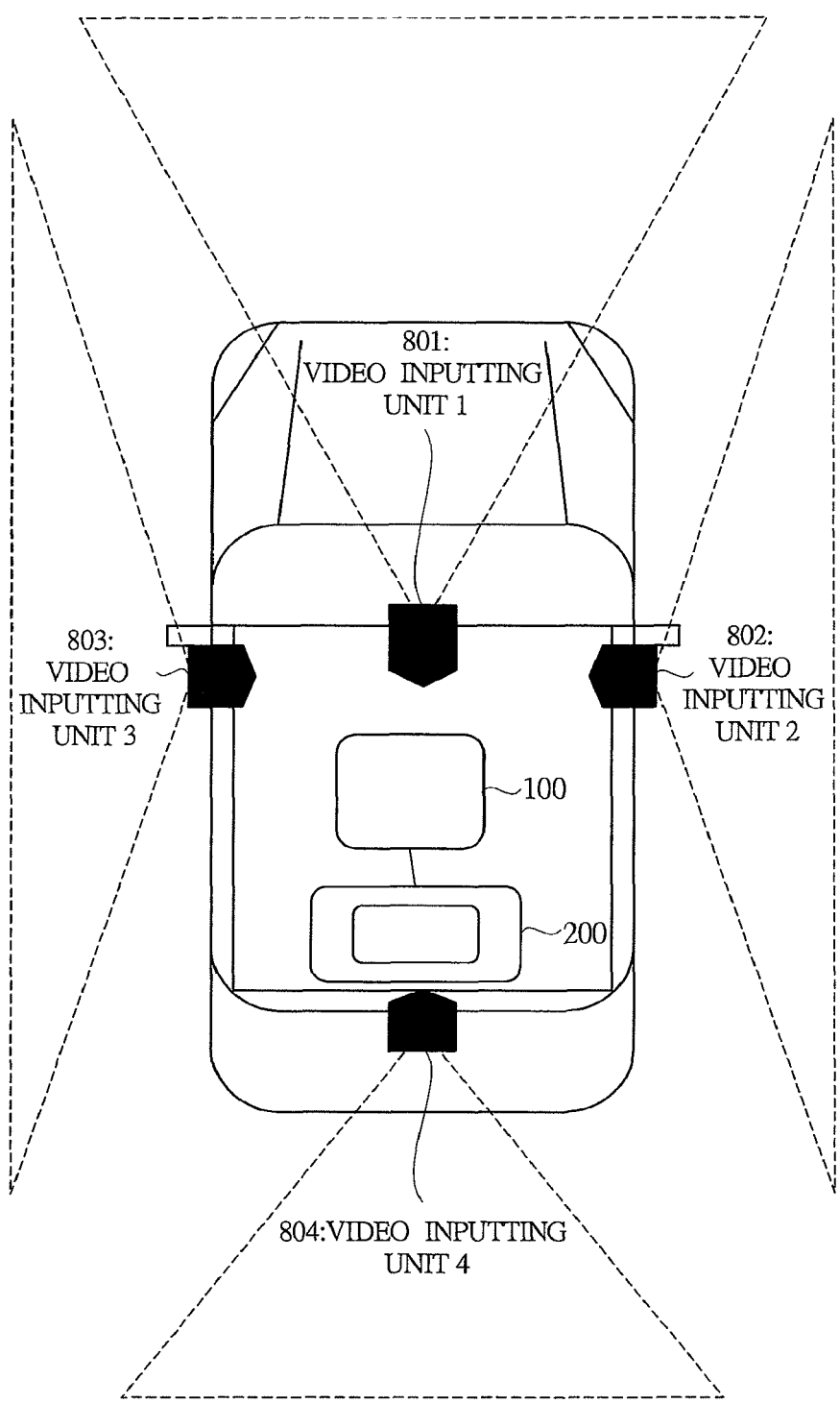
FIG. 10 is an explanatory diagram explaining a specific another usage example of the image processing device according to the embodiment of the present invention.

Next, with reference to FIG. 10, a specific another usage example of the image processing device according to the embodiment of the present invention is described. FIG. 10 is an explanatory diagram explaining the specific another usage example of the image processing device according to the embodiment of the present invention.

In FIG. 10, four video inputting units (801 to 804) are provided, and each of them is installed on front, back, right, and left sides of a motor vehicle. For example, when the downward image illustrated as 301 in FIG. 5 is provided, the processing of the viewpoint conversion and the setting of the image processing unit for these four video inputting units (801 to 804) are different from each other. That is, for each video input, individual conversion map and command list are required.

Figure 11:
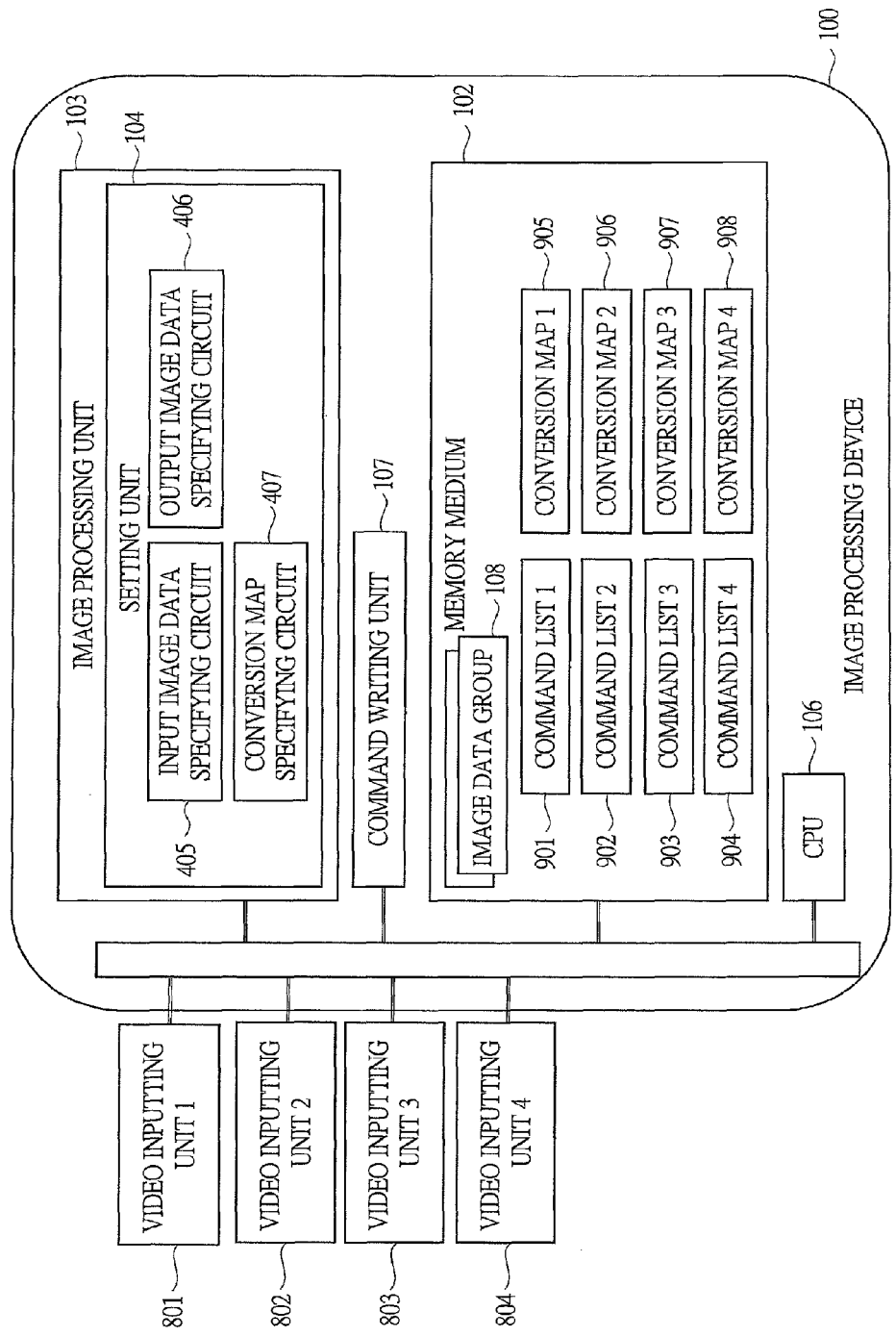
FIG. 11 is a structure diagram illustrating a detailed structure of the image processing device in the usage example illustrated in FIG. 10.

With reference to FIG. 11, a detailed structure of the image processing device in the usage example illustrated in FIG. 10 is described. FIG. 11 is a structure diagram illustrating the detailed structure of the image processing device in the usage example illustrated in FIG. 10.

In FIG. 11, the structure in FIG. 1 is extended for handling a plurality of video inputs.

In FIG. 11, four video inputting units (801 to 804) are provided, and individual command lists (901 to 904) and individual conversion maps (905 to 908) are provided for the video inputs, respectively.

Also, each video input data is written on any image data in the image data groups 108, and is transferred to the command writing unit 107 after the writing. That is, the command writing unit 107 receives synchronization signals from the four video inputting units (801 to 804), and interprets and stores their statuses.

There are some methods for achieving the processing for the video input from the video inputting units (801 to 804) illustrated in FIG. 10 with using the structure illustrated in FIG. 11.

Hereinafter, an example that each video input is inputted at a fixed timing is described with reference to FIGS. 12 and 13, and an example that each video input is inputted at an unfixed timing is described with reference to FIGS. 14 to 16.

Figure 12:
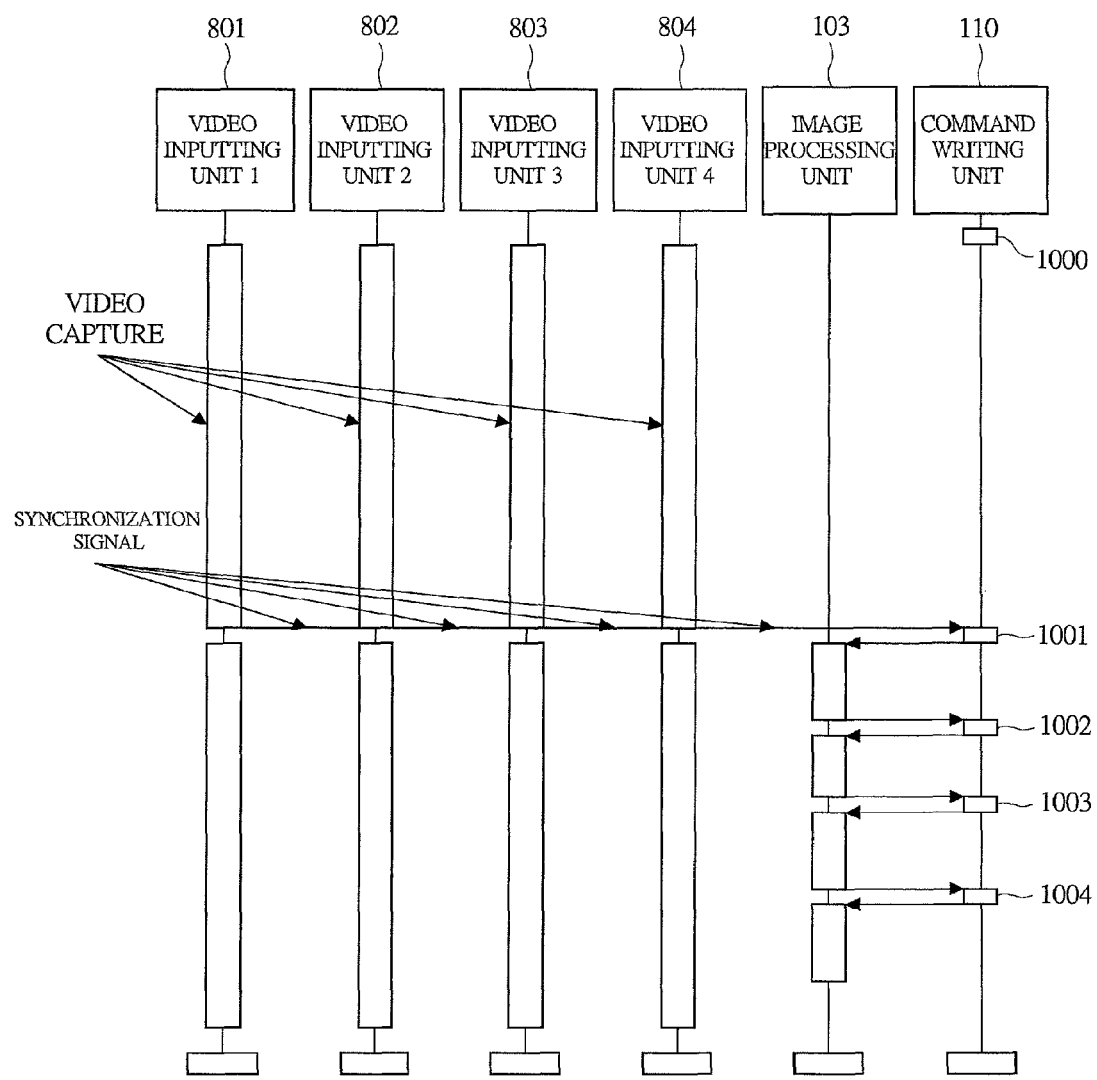
FIG. 12 is an explanatory diagram explaining a processing flow in an image processing for synchronized video input of the image processing device illustrated in FIG. 11.

First, FIG. 12 illustrates the case that each of the four video input data is inputted at the fixed timing. For example, a case that all of the video data inputs from the video inputting units (801 to 804) are inputted at the same period in an order of the video inputs 1, 2, 3, and 4 is considered. In this case, the four command lists (901 to 904) illustrated in FIG. 11 are collectively and sequentially processed.

Figure 13:
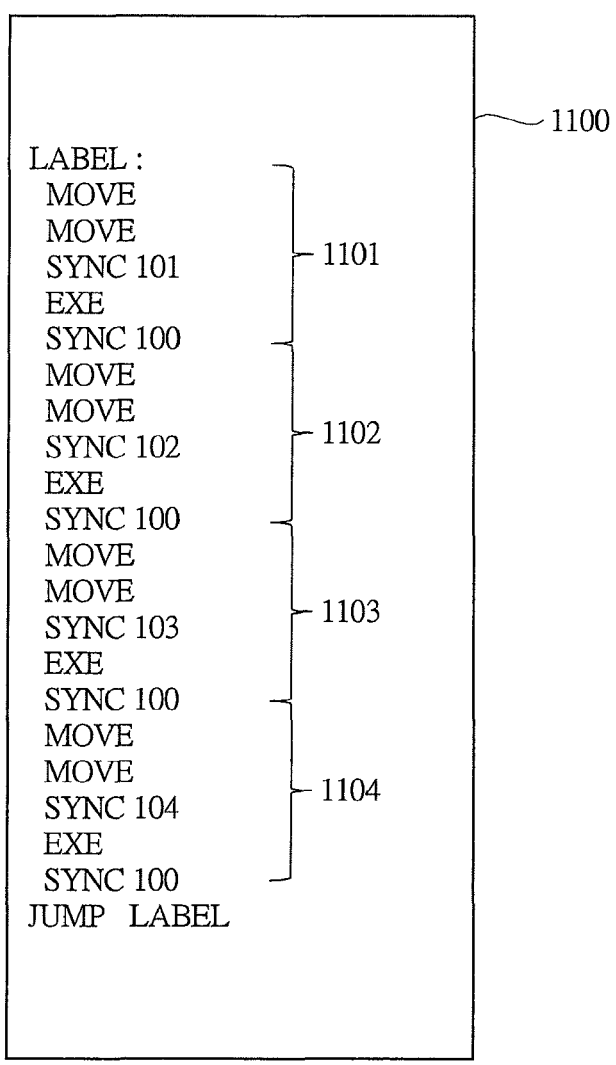
FIG. 13 is a diagram illustrating one example of the command list used in the processing illustrated in FIG. 12.

An example of the command lists is shown in a command list 1100 in FIG. 13.

First, the command list 1100 is specified to the command writing unit 110, and the command writing unit 110 is activated (step 1000).

And, the image processing is set and activated by receiving a synchronization signal from a video inputting unit 1 (801) with using commands "1101" in FIG. 13, and hereinafter, the image processing is sequentially set and activated by receiving synchronization signals from a video inputting unit 2 (802) with using commands "1102" in FIG. 13, from a video inputting unit 3 (803) with using commands "1103" in FIG. 13, and from a video inputting unit 4 (804) with using commands "1104" in FIG. 13 (steps 1001 to 1004).

Even in this case, the conversion processing can be performed after the video capture without the mediation of the CPU 106 by using the command list 1100 and the command writing unit 110.

Figure 14:
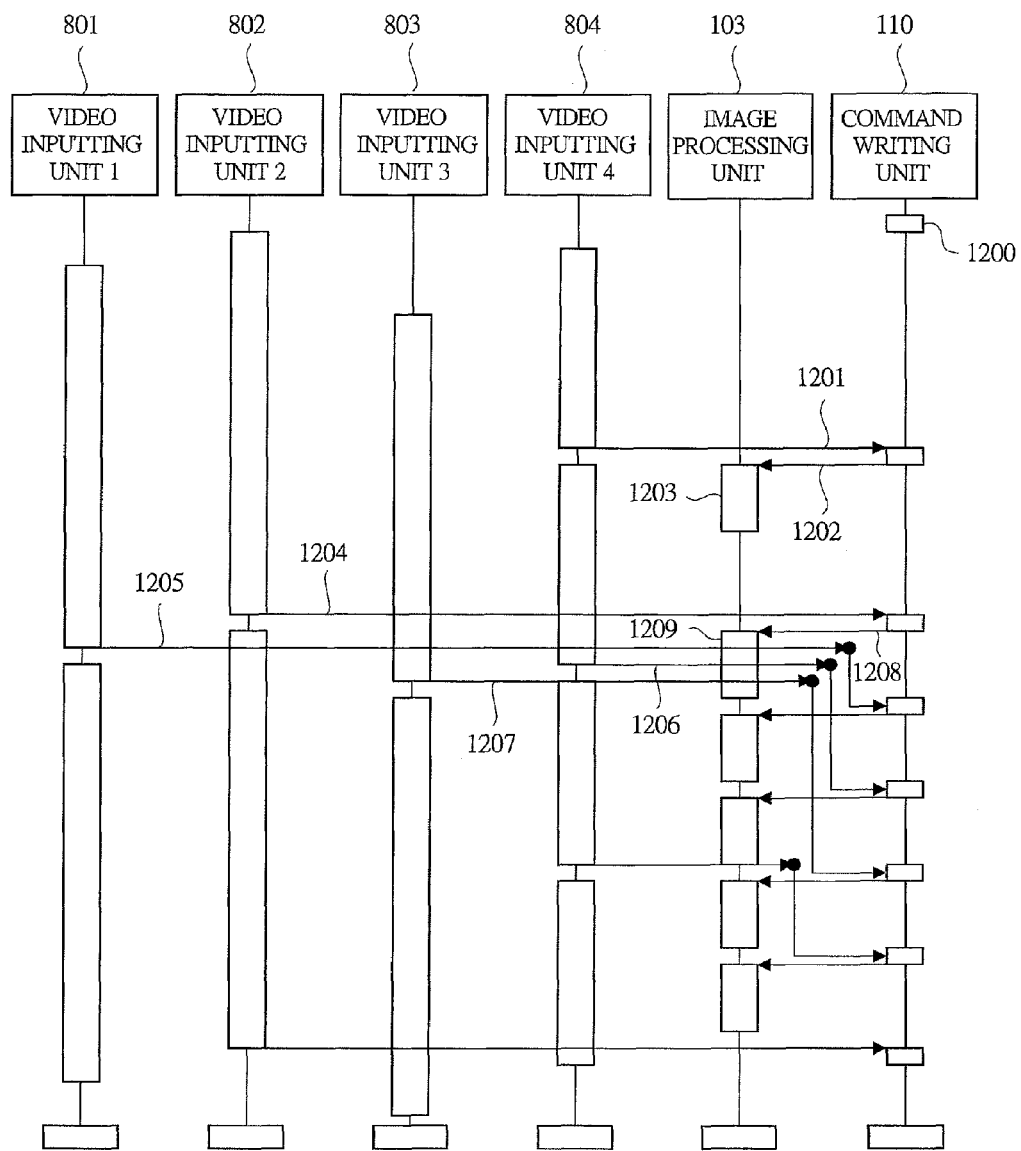
FIG. 14 is an explanatory diagram explaining a processing flow in an image processing for non-synchronized video input of the image processing device illustrated in FIG. 11.

Next, FIG. 14 illustrated the case that each of the four video inputs is inputted at the unfixed timing. For example, a case that inputs of four cameras are not synchronized with each other, a case that a frame rate is different depending on the camera, or others is considered.

In this case, the conversion processing is performed in an order of, for example, the input of the video input end synchronization signal. For the processing in the order, the synchronization signal storing circuit 1704 and the command list specifying circuit 1703 inside the command writing unit 110 have, for example, structures illustrated in FIG. 16.

Figure 16:
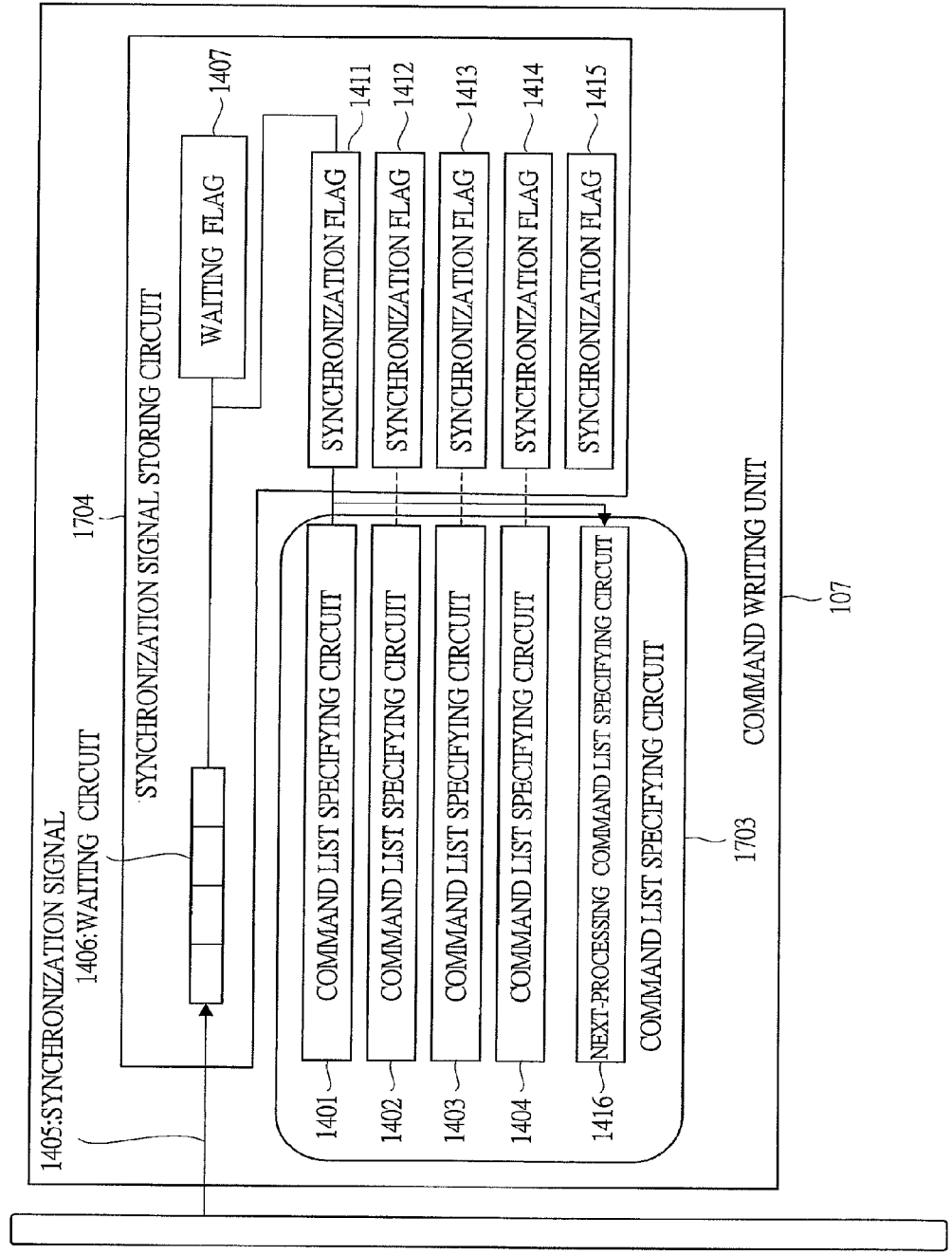
FIG. 16 is a diagram illustrating a structure of the command writing unit when the non-synchronized video input is handled in the image processing device according to an embodiment of the present invention.

In FIG. 16, there are provided four command list specification maintaining circuits (1401 to 1404) of storing a beginning address of each command list in the storage medium. When a synchronization signal 1405 is inputted from arbitral video inputting unit to the synchronization signal storing circuit 1704, the synchronization signal storing circuit 1704 inputs the received signal to waiting circuit 1406 having a queue structure once, and waits for the synchronization signal.

At this time, it is identified which video input inputs the synchronization signal. In a beginning part of the waiting circuit 1406, after awaiting flag 1407 is turned on, the waiting flag 1407 is cleared, a start address of the command list is read from the command list specification storing circuit corresponding to the video input, and the data is written on next-processing command list specifying circuit 1416.

If the waiting flag 1407 is not on, the above-described processing is waited until it is turned on. Also, at this time, a corresponding flag of synchronization flags 1411 to 1414 is turned on. Note that a synchronization flag 1415 is a flag turned on in accordance with the end synchronization signal from the image processing unit 103. The "SYNC" command in the command list awakes the waiting status in accordance with the flag status.

Figure 15:
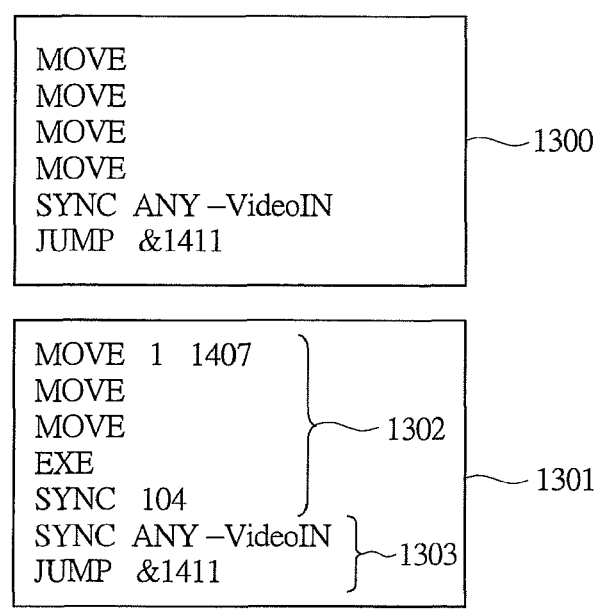
FIG. 15 is a diagram showing one example of the command list used in the processing illustrated in FIG. 14.

In order to achieve the video processing from the video inputting units (801 to 804) illustrated in FIG. 10 with using the structure, a dummy command list shown as 1300 in FIG. 15 is prepared first, and this command list is specified to the command list specifying circuit 1703 at an initialization period to activate the command writing unit 107.

A "SYNC ANY-VideoIN" command in the command list 1300 is a command for awakening the waiting status when any synchronization signal is received from the four video inputting units. That is, until any video input signal is inputted, the command writing unit 107 is in the waiting status. Note that the waiting flag 1407 is on at this time.

A command list corresponding to each video input has a structure shown as 1301 in FIG. 15. Commands 1302 are different commands depending on each video input, and sequential commands 1303 are the same not depending on each video input. A "JUMP &1411" command is a command for specifying a program counter to an address indicated by the next-processing command list specifying circuit 1416.

FIG. 14 illustrates a processing flow in the command list in FIG. 15. After the initialization is performed by the command list 1300 (step 1200), the command writing unit 110 becomes in the waiting status by the "ANY-VideoIN" command, and the synchronization signal storing circuit 1704 waits for the video input synchronization signal.

First, the synchronization signal is inputted from the video inputting unit 4 (804) (step 1201). Since the waiting flag 1407 is on, the synchronization signal inputted in the queue returns the waiting flag 1407 to be 0 once, and the beginning address of the command list for the video inputting unit 4 (804) controlled by the command list specification controlling circuit is read from the command list specification controlling circuit 1404 and is written on the next-processing command list specifying circuit 1416.

Next, the synchronization flag 1414 is turned on to awake the waiting status of the command writing unit 110, and the command list for the video inputting unit 4 (804) is executed. After the waiting flag 1407 is turned on by a "MOVE 1 1407" command in the command list 1301, the image processing unit 103 is activated by an "EXE" command (Step 1202), and the waiting status that the image processing end signal is inputted is started by a "SYNC 104" command.

After the image processing (step 1203) is ended, the command list is executed again, and the processing is waited by the "SYNC ANY-VideoIN" command until the video input synchronization signal is inputted.

And then, the synchronization signals are sequentially sent from each of the video inputting unit 2 (802), the video inputting unit 1 (801), the video inputting unit 4 (804), and the video inputting unit 3 (803) (steps 1204, 1205, 1206, and 1207). The firstly-sending synchronization signal in the step 1204 is similarly processed as the step 1201, and the image processing unit 103 is activated (step 1208).

During this processing, the other signals are stored in the waiting circuit 1406. After the image processing (step 1209) is ended, processing corresponding to steps 1205, 1206, and 1207 are sequentially performed.

By using such a structure, even in the case that the video input signal is irregularly inputted, the processing with using the image processing unit for handling the irregular input can be performed without the mediation of the CPU 106. Note that the simple queue structure is adopted for the waiting circuit 1406 in FIG. 16. However, the waiting circuit 1406 may have a structure such that, a priority is given to each video input signal, and a synchronization signal having a high priority is inputted to the beginning part of the queue.

Note that, even without the command list specification controlling circuits (1404 to 1404), a structure is considered, in which the command list is one, the inputted synchronization signal is identified by a "CMP" command in the command list, and the signal is conditionally branched by a "BLN" command, so that a command is selected.

Although it is assumed that the image processing unit 103 is used for only the conversion processing right after the video input in the above description, the image processing unit 103 may be also used for the processing during the recognition processing in the usage example as illustrated in FIG. 10 in practical. That is, both of the conversion processing right after the video input and other general processing have to exist together. Therefore, as illustrated in FIG. 16, the synchronization signal storing circuit includes a synchronization flag for the general processing as a matter of convenience, and the synchronization signal for the general processing is inputted to the waiting circuit similarly to the synchronization signal from the video inputting unit, so that both of the general processing and the conversion processing can exist together.

Figure 17:
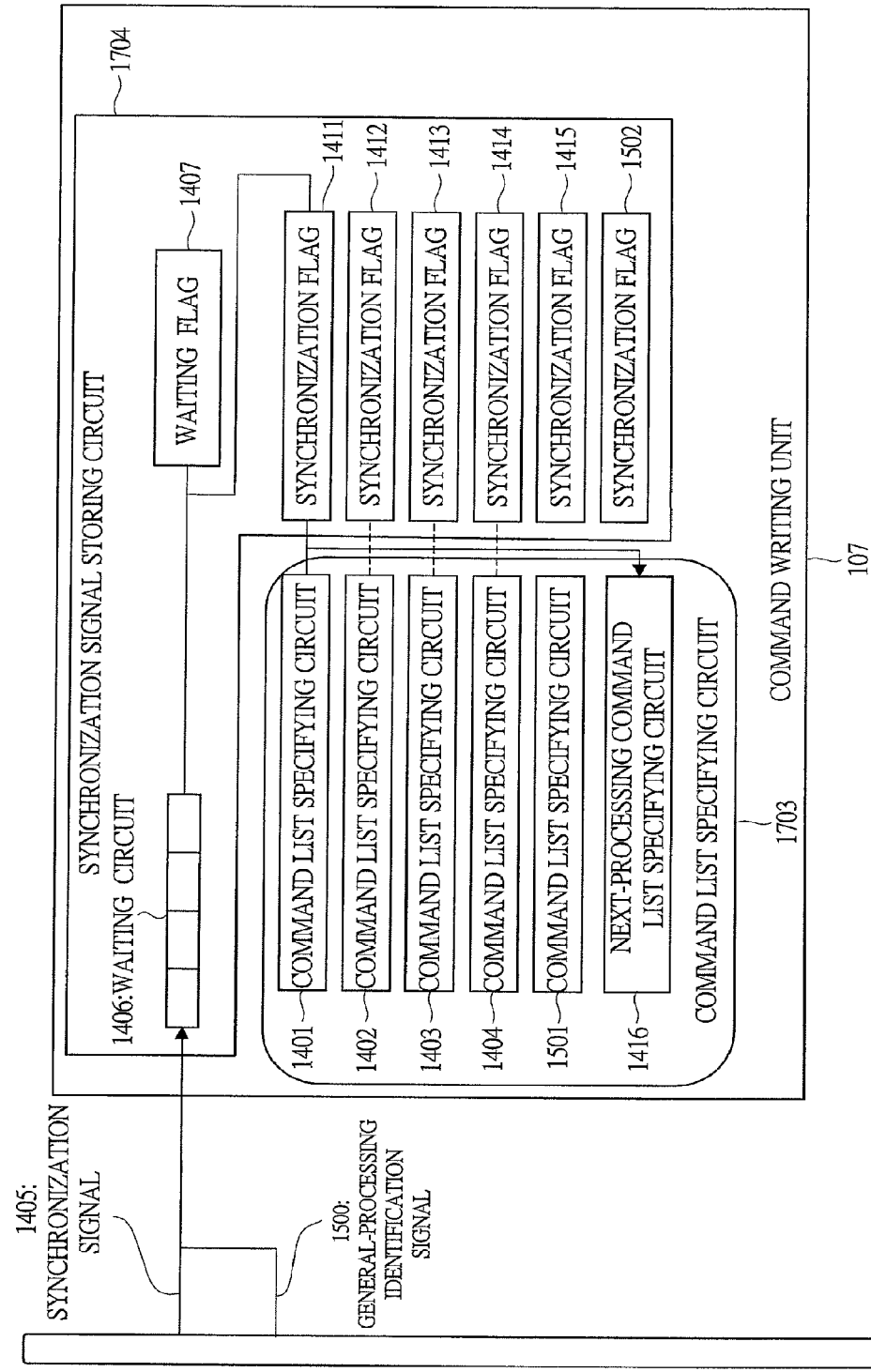
FIG. 17 is a diagram illustrating a structure that the command writing unit in FIG. 16 is extended.

FIG. 17 is a diagram in which FIG. 16 is extended.

FIG. 17 is a diagram illustrating an extended structure of the command writing unit in FIG. 16.

In FIG. 17, a general-processing identification signal 1500 identified by the CPU 106 as a target general processing is inputted to the waiting circuit 1406, and command list specification controlling circuit 1501 for the general processing is newly provided for the command list specification controlling circuit. Also, a synchronization flag 1502 for the general processing is provided.

When the synchronization flag for the video inputting unit or the synchronization flag for the general processing is turned on, the waiting status is awoken by the "SYNC" command shown in FIG. 15. If there are a plurality of general processing, it is considered that the number of the command list specification controlling circuit is increased by the number of the general processing, or the plurality of general processing are listed and repeatedly used in the general processing.

It is also considered that the waiting list in the waiting circuit 1406 contains both of the information for identifying the synchronization signal and the information for specifying the command list. Also, even without the command list specification controlling circuit, a structure is considered, in which the command list is one, the inputted synchronization signal is identified by a comparison command in the command list or others, and the signal is conditionally branched, so that a command is selected.

Further, in a case of a plurality of image processing units 103 each having the same role with the other or a case of a plurality of image processing unit 103 each having a different role from the other, it is also required to synchronize among the plurality of image processing unit 103.

As shown in FIG. 3, since the command for sending the synchronization signal is contained in the command list, the processing is synchronized with another image processing unit 103 with using the command. For example, in a case of two image processing unit 103 of "A" and "B" each having the structure illustrated in FIG. 6, when the command writing unit of A waits for a synchronization signal of B by the "SYNC" command, the image processing unit 103 of B issues a "SEND" command to awake the writing status of the command writing unit 107 of A, so that the processing proceeds.

In the foregoing, the present invention made by the inventors has been concretely described based on the embodiments. However, it is needless to say that the present invention is not limited to the foregoing embodiments and various modifications and alterations can be made within the scope of the present invention.

The present invention relates to an image processing device of processing images from an imaging device or others, and can be widely used for a processing device with using an image processing hardware and a general-purpose calculator of processing an image data with mediation of a storage medium.

What is claimed is:

1. An image processing semiconductor device comprising:
   a central processing unit (CPU);
   an image processing circuit configured to process video image data acquired by a video inputting circuit and stored in a storage medium; and
   a command writing circuit configured to activate the image processing circuit in response to receiving a notification from the video inputting circuit that the acquisition of the video image data is complete,
   wherein the CPU does not receive the notification from the video inputting circuit that the acquisition of the video image data is complete.

2. An image processing device comprising:
   a storage medium configured to store video image data acquired by a video inputting circuit;
   a central processing unit (CPU);
   an image processing circuit configured to process the video image data stored in the storage medium, the image processing circuit including a setting circuit configured to determine a processing content of the image processing circuit; and
   a command writing circuit configured to set and activate the image processing circuit based on a synchronization signal, received from the video inputting circuit, indicating that the acquisition of the video image data is complete,
   wherein the CPU does not receive the synchronization signal from the video inputting circuit indicating that the acquisition of the video image data is complete.

3. A method for image processing, comprising:
   providing a central processing unit (CPU), an image processing circuit, and a command writing circuit;
   processing, with the image processing circuit, video image data acquired by a video inputting circuit and stored in a storage medium; and
   operating the command writing circuit to activate the image processing circuit in response to receiving a notification from the video inputting circuit that the acquisition of the video image data is complete,
   wherein the CPU does not receive the notification from the video inputting circuit that the acquisition of the video image data is complete.

4. A method for image processing, comprising:
   providing a storage medium, a central processing unit (CPU), an image processing circuit having a setting circuit, and a command writing circuit,
   storing, in the storage medium, video image data acquired by a video inputting circuit;
   processing, with the image processing circuit, the video image data stored in the storage medium, the setting circuit determining a processing content of the image processing circuit; and
   operating the command writing circuit to set and activate the image processing circuit based on a synchronization signal, received from the video inputting circuit, indicating that the acquisition of the video image data is complete,
   wherein the CPU does not receive the synchronization signal from the video inputting circuit indicating that the acquisition of the video image data is complete.

* * * * *